(12) United States Patent
Thakore et al.

(10) Patent No.: US 11,650,753 B2
(45) Date of Patent: May 16, 2023

(54) FIRMWARE-CONTROLLED AND TABLE-BASED CONDITIONING FOR SYNCHRONOUS HANDLING OF EXCEPTION CASES

(71) Applicant: Beijing Tenafe Electronic Technology Co., Ltd., Beijing (CN)

(72) Inventors: Priyanka Nilay Thakore, Mountain View, CA (US); Chen Xiu, Beijing (CN); Lyle E. Adams, San Jose, CA (US); Wanqiang Zhang, Beijing (CN)

(73) Assignee: Beijing Tenafe Electronic Technology Co., Ltd.

( * ) Notice: Subject to any disclaimer, the term of this patent is extended or adjusted under 35 U.S.C. 154(b) by 0 days.

(21) Appl. No.: 17/866,169

(22) Filed: Jul. 15, 2022

(65) Prior Publication Data
US 2023/0034009 A1    Feb. 2, 2023

Related U.S. Application Data

(60) Provisional application No. 63/226,009, filed on Jul. 27, 2021.

(51) Int. Cl.
*G06F 3/06* (2006.01)
*G06F 9/48* (2006.01)

(52) U.S. Cl.
CPC .......... *G06F 3/0655* (2013.01); *G06F 3/0604* (2013.01); *G06F 3/0679* (2013.01); *G06F 9/4881* (2013.01)

(58) Field of Classification Search
CPC .... G06F 4/0655; G06F 4/0604; G06F 4/0679; G06F 3/0655; G06F 3/0604; G06F 3/0679
See application file for complete search history.

(56) References Cited

U.S. PATENT DOCUMENTS 8,972,627 B2  3/2015 Strasser
9,455,955 B2  9/2016 Fetik
(Continued)

OTHER PUBLICATIONS

Intel, Intel StrataFlash Memory (J3), 2005, Intel, 256-Mbit (x8/x16) datasheet, pp. 1-72 https://docs.rs-online.com/6091/0900766b8062d526.pdf (Year: 2005).

*Primary Examiner* — David Yi
*Assistant Examiner* — Nicholas A. Paperno
(74) *Attorney, Agent, or Firm* — Van Pelt, Yi & James LLP

(57) ABSTRACT

In response to receiving an exception indication, an exception-handling state variable in state information is asserted. Firmware instruction(s) are selected from a plurality of firmware instructions based at least in part on: (1) a conditions table that includes condition(s) for handling the plurality of firmware instructions and (2) the state information that includes the exception-handling state variable. It is determined how to handle the selected firmware instruction(s) based at least in part on: (1) the conditions table and (2) the state information that includes the exception-handling state variable where. The plurality of firmware instructions includes: (1) a non-exception-handling set of firmware instruction(s) and (2) an exception-handling set of firmware instruction(s). The conditions table prioritizes execution, by the hardware, of the exception-handling set of firmware instructions over that of the non-exception-handling set of firmware instructions in the event the exception-handling state variable is asserted. A storage media device is communicated with via an interface.

12 Claims, 10 Drawing Sheets

(56) References Cited

U.S. PATENT DOCUMENTS

| | | |
|---|---|---|
| 9,569,116 B1 | 2/2017 | Colgrove |
| 10,331,370 B2 | 6/2019 | Fernandez |
| 2015/0363109 A1* | 12/2015 | Frick ..................... G06F 3/0659 |
| | | 711/112 |
| 2016/0170768 A1* | 6/2016 | Alexander ............ G06F 9/5005 |
| | | 712/244 |
| 2019/0121720 A1 | 4/2019 | Jung |
| 2019/0286364 A1* | 9/2019 | Gavens ................ G06F 3/0655 |
| 2022/0101927 A1 | 3/2022 | Madraswala |
| 2022/0147247 A1 | 5/2022 | Ammari |
| 2022/0189561 A1 | 6/2022 | Kamata |

* cited by examiner

FIRMWARE-CONTROLLED AND TABLE-BASED CONDITIONING FOR SYNCHRONOUS HANDLING OF EXCEPTION CASES

CROSS REFERENCE TO OTHER APPLICATIONS

This application claims priority to U.S. Provisional Patent Application No. 63/226,009 entitled FIRMWARE CONTROLLED HARDWARE SEQUENCE HANDLING FOR REGULAR AND EXCEPTION CASES filed Jul. 27, 2021 which is incorporated herein by reference for all purposes.

BACKGROUND OF THE INVENTION

Storage systems, such as NAND Flash storage systems, are made up of multiple components, each component of which may be manufactured by a variety of manufacturers. For example, in a storage system, the storage media devices (e.g., a NAND Flash memory device) may be manufactured by a variety of companies. New and improved storage controllers which are better able to manage a variety of storage media devices from a variety of manufacturers under a variety of conditions (e.g., regular handling as well as exception handling) in a manner that is sensitive to size, cost, and/or power consumption would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
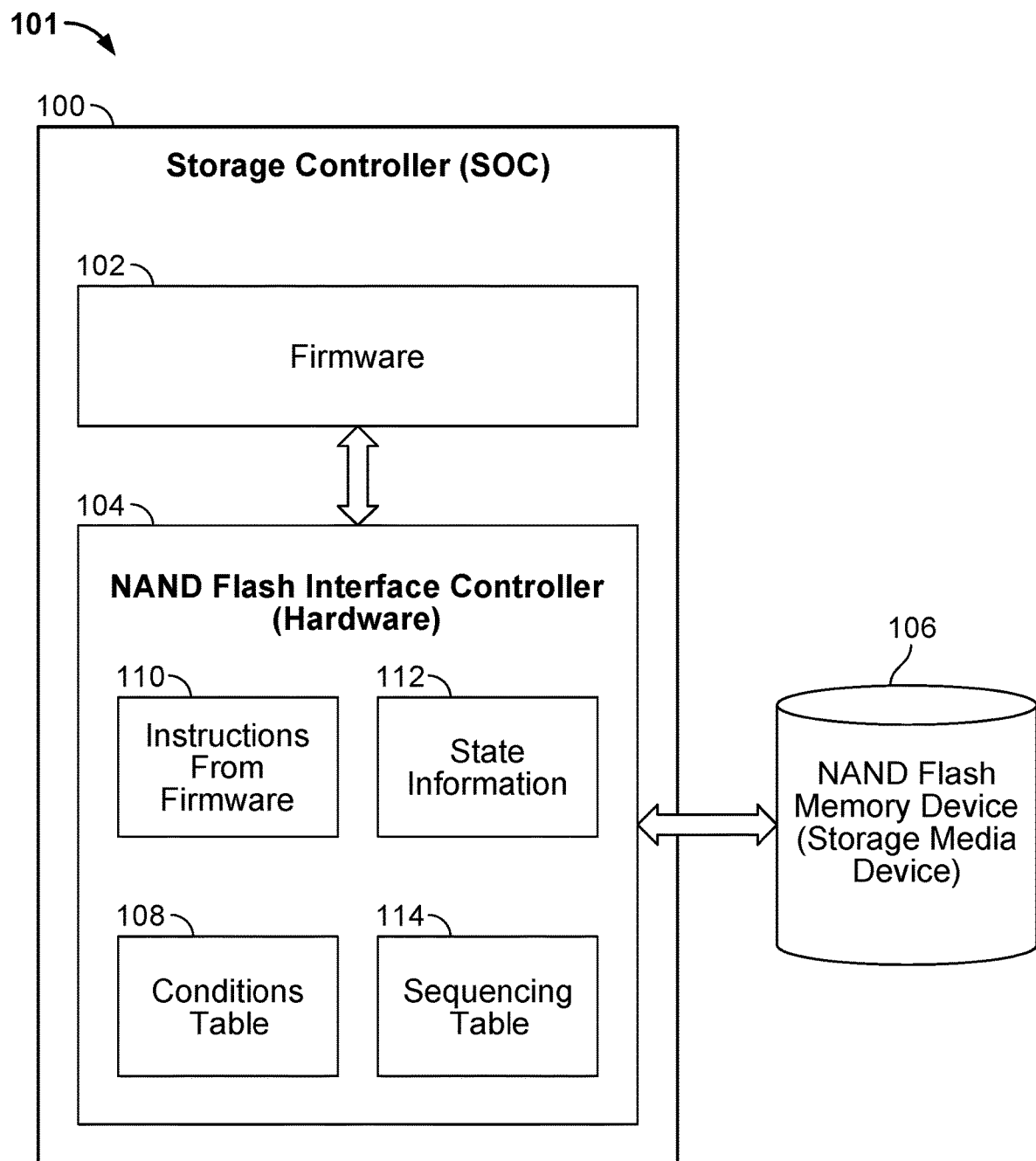
FIG. 1 is a diagram illustrating an embodiment of a storage system with a NAND Flash interface controller that includes a conditions table via which firmware specifies to hardware the conditions for handling firmware instructions.

FIG. 1 is a diagram illustrating an embodiment of a storage system with a NAND Flash interface controller that includes a conditions table via which firmware specifies to hardware the conditions for handling firmware instructions. In this example, a storage system (101) includes a storage controller (100) that manages a storage media device, which in this example is a NAND Flash memory device (106). The storage controller (100) is implemented on a system on chip (SOC) that includes firmware (102) and a NAND Flash interface controller (104), the latter of which is implemented on hardware (e.g., an application-specific integrated circuit (ASIC) or a field-programmable gate array (FPGA)).

In this example, the storage system (101) is designed to use a variety of NAND Flash memory devices (106) that are manufactured by multiple suppliers. As such, the storage controller (100) needs to be able to support different storage media devices from different suppliers and/or manufacturers (e.g., where the different storage media devices have different supported operations, different register locations, different command or instruction sequences, different timing requirements, etc.). Using multiple storage media device suppliers may reduce the risk of supply chain issues and/or make suppliers compete against each other for better pricing, which may be desirable for the manufacturer of the storage system (101).

To support a variety of NAND Flash memory devices (106), the NAND Flash interface controller (104) in this example includes a conditions table (108) with one or more (e.g., manufacturer-specific) conditions for handling instructions from firmware (110). As will be described in more detail below, the conditions table (108) is programmed by and/or configured by firmware (102) and is used by the NAND Flash interface controller (104) to (as an example) decide or otherwise select what firmware instruction(s) to assess or otherwise evaluate next, and whether to actually perform those selected firmware instruction(s) based on the state information (112). The sequencing table (114) is used to store the (e.g., manufacturer-specific) instruction sequences that are sent from the NAND Flash interface controller (104) to the NAND Flash memory device (106). As part of an initialization process, the conditions table (108) and sequencing table (114) may be programmed by firmware depending upon the particular NAND Flash memory device (106) (e.g., manufacturer, model, and/or version).

A benefit of the storage controller embodiments and/or techniques described herein is that they are flexible enough to work with a variety of NAND Flash memory devices (106) from different manufacturers while also being implemented in a manner that is sensitive to the size, cost, and/or power consumption of the storage controller (100). Some other storage controllers use a general-purpose processor (e.g., a CPU) to give their storage controller completely programmable control. However, such designs are unattractive (particularly for applications that are sensitive to size, cost, and/or power consumption) because general-purpose processors require a large area of silicon (i.e., they are large and/or expensive to manufacture) and consume a relatively large amount of power compared to the partially-programmable controllability offered by embodiments described herein. The embodiments described herein offer a sufficient degree of flexibility while being mindful of size, cost, and/or power consumption.

Even if only one storage media device manufacturer is supported, the flexibility offered is desirable because a storage media device can go through different versions with different instruction sequences, supported features, timing requirements, etc. The table-based conditions and table-based sequencing may also be used to optimize the performance of the storage system (101), even if there is only one storage media device manufacturer. For example, a given NAND Flash memory device (106) may perform better when certain types of operations are grouped together instead of having them broken up. Or, if the NAND Flash memory device (106) includes multiple dies, then accessing dies in certain sequences may offer better performance results than others (e.g., it may be better to group accesses by die, instead of interleaving or switching back and forth between dies). The conditions table (108) and/or sequencing table (114) may be used to optimize the firmware instructions (110) in a manner that improves performance of the storage system (101) (e.g., by performing the instructions in an efficient sequence and/or during a better state of the storage system (101)).

Even though some other storage controllers may have table-based sequencing, they do not include table-based conditioning which allows more of the high-level controls to be moved from the firmware domain to the interface controller domain, reducing firmware complexity, reducing firmware code memory size, and allowing a lower-power processor to be used, while providing a high level of flexibility to support a wide range of functional NAND Flash behaviors, optimize system performance (e.g., for the specific timing requirements and/or rules associated with a given NAND Flash memory device), and support different Quality of Service (QoS) models.

The storage system (101) shown here may be used in a variety of applications and/or scenarios. First, some embodiments of the storage controller (100) that may be beneficial and/or useful during normal and/or regular operating conditions (e.g., when the NAND Flash memory device (106) has not issued an indication of an error or exception) are described in the figures below. Then, some embodiments of the storage controller (100) that may be beneficial and/or useful during error and/or exception operating conditions (e.g., when the NAND Flash memory device (106) issues an error or exception notification) are described. As used herein, the term "exception" is understood to include "error", so that (as an example) "exception-handling" is interpreted to include "error-handling" and so on.

Figure 2:
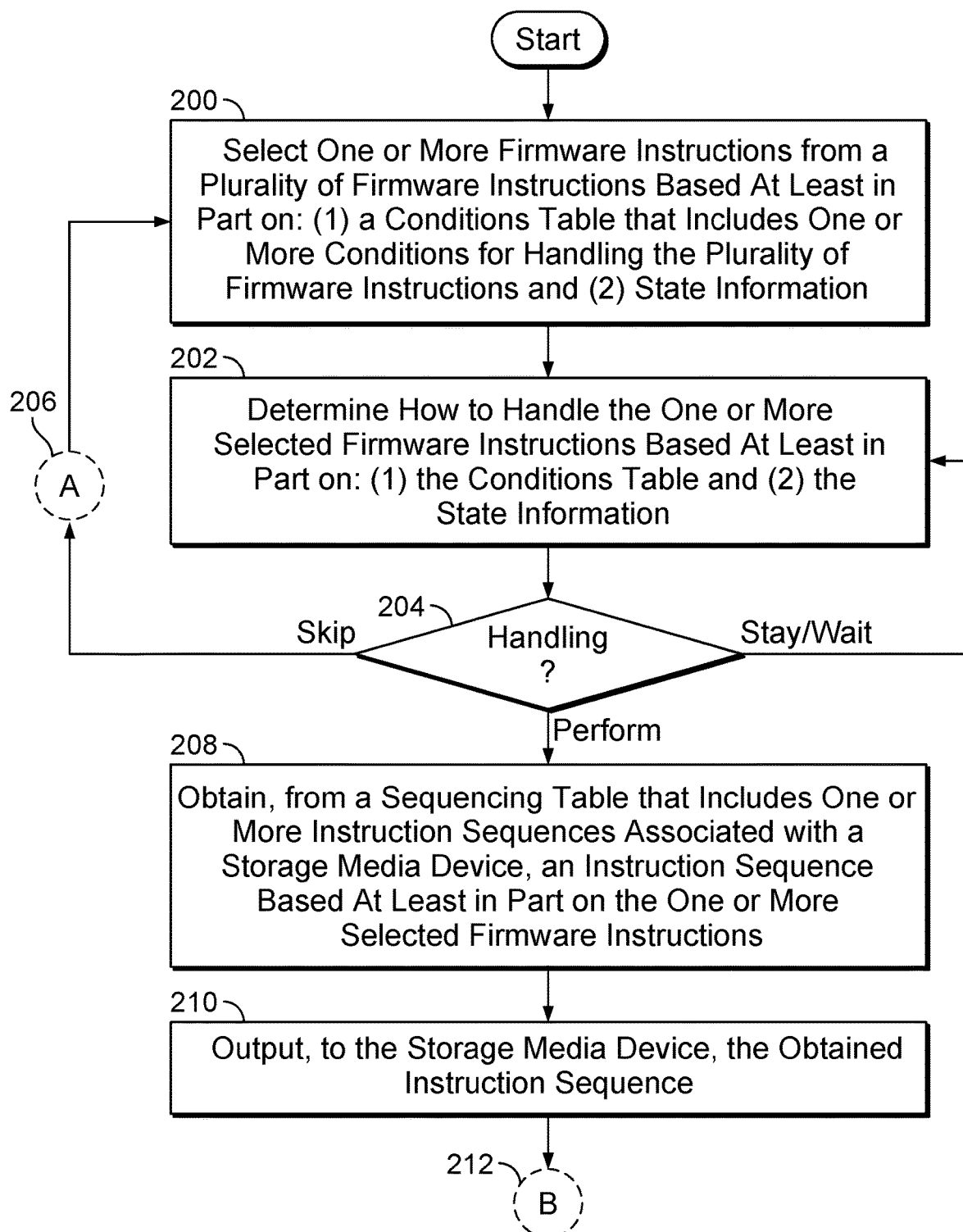
FIG. 2 is a flowchart illustrating an embodiment of a process to manage a storage media device using a conditions table and a sequencing table.

FIG. 2 is a flowchart illustrating an embodiment of a process to manage a storage media device using a conditions table and a sequencing table. In some embodiments, the process of FIG. 2 is performed during normal and/or regular operating conditions. In one example, the process of FIG. 2 is performed by NAND Flash interface controller (104) from FIG. 1.

At 200, one or more firmware instructions are selected from a plurality of firmware instructions based at least in part on: (1) a conditions table that includes one or more conditions for handling the plurality of firmware instructions and (2) state information.

In FIG. 1, for example, the state information (112) may relate to the state of the NAND Flash memory device (106), the NAND Flash interface controller (104), and/or the firmware (102). In one example of step 200, the NAND Flash memory device (106) is in the middle of an operation and the operation status or state is reflected in the state information (112). During this state, sending certain types of firmware instructions (e.g., from those stored in block 110) to the NAND Flash memory device (106) may not be permitted by the manufacturer, or may be permitted but may be sub-optimal (e.g., because it slows down the NAND Flash memory device (106)). The conditions table (108) may be programmed (e.g., by firmware (102)) to specify the rules or conditions (e.g., including permitted or not permitted states for certain types of firmware operations) for selecting the next firmware instruction(s).

In some embodiments, firmware instructions (e.g., block 110 in FIG. 1) are stored in multiple queues and the selection at step 200 includes selecting one of the queues.

In one example of step 200, the conditions table is used to specify that a given type of firmware command or instruction should be treated differently depending upon specified conditions or a particular state. In one example, if the storage media device is busy performing a time-consuming operation, then some firmware instructions may not be permitted or may be permitted but are sub-optimal in that particular state. Or, under certain conditions, one firmware command queue may have a higher priority than another queue but under other conditions or states, a different prioritization may be required or optimal. This information is specified in the conditions table.

In some embodiments, hardware (e.g., NAND Flash interface controller (104) in FIG. 1) updates the state information (112) because it is faster than firmware (102) and is therefore better suited to updating the state information. In some embodiments, the state information (112) is updated by the firmware (102), for example, because the information being updated is a state associated with the firmware (102).

Returning to FIG. 2, at 202, it is determined how to handle the one or more selected firmware instructions based at least in part on: (1) the conditions table and (2) the state information. To put it another way, step 200 selects what firmware instruction(s) to evaluate or assess next. Step 202 decides how to handle those firmware instruction(s). In this example, the possible handling options at step 202 are: (1) skipping (i.e., discarding) the selected firmware instruction(s), (2) performing the selected firmware instruction(s), or (3) performing the selected firmware instruction(s) after waiting for a condition to be true (e.g., for the state information to change, for a timer to expire, etc.).

Depending upon the handling, the process forks (204). If the firmware instruction(s) is/are skipped, then a next batch of firmware instruction(s) is selected again at step 200. In some embodiments, additional step(s) (206) is/are performed, for example, to report to the firmware which firmware instruction(s) was/were skipped so the firmware can proceed accordingly and is not waiting for a result from a skipped and/or discarded firmware instruction. An example of this is described in more detail below.

If the handling is to stay and/or wait, then the process returns to step 202. For example, the process may wait for the state information to change so that the handling can switch from "stay/wait" to "perform" or "skip."

If the handling is to perform the firmware instruction(s), then at 208, an instruction sequence is obtained from a sequencing table that includes one or more instruction sequences associated with a storage media device, based at least in part on the one or more selected firmware instructions. The obtained instruction sequence is then output to the storage media device at 210.

For example, suppose the firmware instruction is a status check of the storage media device. The instruction sequence obtained at step 208 may describe the signaling required to communicate a status check to the storage media device for that manufacturer, model, and/or version. Step 210 would then drive the specified signal levels for the specified signal timing (e.g., how long to hold or when to switch those signals levels) on the physical pins or connections between (as an example) the NAND Flash interface controller (104) and the NAND Flash memory device (106) in FIG. 1.

In some embodiments, additional step(s) (212) is/are performed. For example, there may be some post-sequence (i.e., after the instruction sequence is output to the storage media device) that is configurable and/or table-based, permitting further flexibility. An example of this is described in more detail below.

To better understand the embodiments described above, it may be helpful to describe more specific and/or detailed examples. The following figure describes a more detailed example of the NAND Flash interface controller (104) from FIG. 1.

Figure 3:
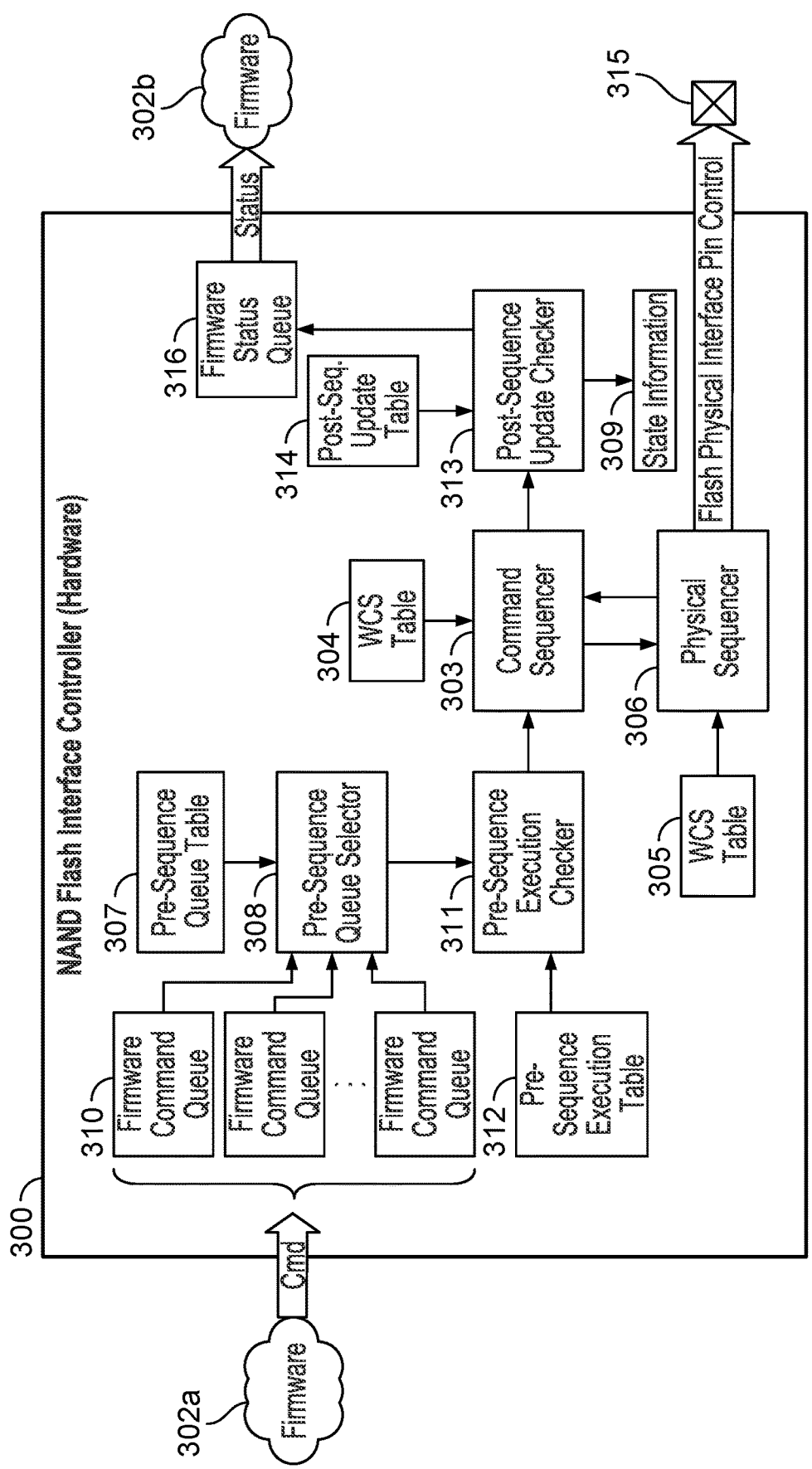
FIG. 3 is a diagram illustrating an embodiment of a NAND Flash interface controller where the table-based conditions are implemented using a pre-sequence queue table, a pre-sequence execution table, and a post-sequence update table.

FIG. 3 is a diagram illustrating an embodiment of a NAND Flash interface controller where the table-based conditions are implemented using a pre-sequence queue table, a pre-sequence execution table, and a post-sequence update table. In some embodiments, the NAND Flash interface controller (104) from FIG. 1 is implemented as shown in FIG. 3.

In this example, firmware (302*a*) sends commands to the NAND Flash interface controller (300) and the firmware commands are stored in one of a plurality of firmware command queues (310). Pre-sequence queue selector (308) selects which firmware command queue (310) to access or process next based on the state information (309) and the pre-sequence queue table (307). More specifically, the pre-sequence queue selector (308) uses the pre-sequence queue table (307) to examine the current state (309) of (as an example) the dies that make up the NAND Flash memory device and/or the storage controller itself to determine if any available firmware instructions in the firmware command queues (310) are appropriate for potential execution at a next interface idle point.

In one example, the pre-sequence queue table (307) is used to specify how the same type of firmware instruction is handled differently depending upon specified conditions or a particular state. For example, if a selected firmware command queue includes two back-to-back firmware instructions of a given type at the top of the selected queue, both of the firmware instructions are forwarded to the pre-sequence execution checker (311) under some conditions and/or states, but only one firmware instruction is forwarded under a different set of conditions and/or states.

The selected firmware instruction(s) are then passed from the pre-sequence queue selector (308) to the pre-sequence execution checker (311) for the next stage of processing. At a high level, the pre-sequence execution checker (311) decides whether to perform a firmware instruction or command passed to it by the pre-sequence queue selector (308) or skip it (in this simple and binary example). For example, firmware (302*a*/302*b*) is much slower than the hardware (300) and may put commands in the firmware command queues (310) that are no longer relevant or no longer need to be performed by the time they reach the pre-sequence execution checker (311).

The pre-sequence execution table (312) may be changed by the firmware (302*a*/302*b*), as or if desired, to control the decision making and/or handling of commands by the pre-sequence execution checker (311). For example, different NAND Flash memory device manufacturers may expose different state information that may be examined by the pre-sequence execution checker (311) and/or different NAND Flash memory device manufacturers may handle commands in a different manner that must be adapted to.

Those firmware instructions which the pre-sequence execution checker (311) decides to perform or otherwise execute are passed from the pre-sequence execution checker (311) to the command sequencer. The command sequencer (303) has access to a first writable control store (WCS) table of command sequences (304). The firmware instructions include an index into this first WCS table (304). The instruction found at this index is the first instruction of the command sequence to execute; sequence execution continues until a sequence termination instruction is encountered.

Each command sequence instruction may contain an index into a physical command table, which is stored in a second writable control store (WCS) table of physical command instructions (305). The physical command instructions are interpreted by a physical command sequencer (306), which includes low-level state machines and logic to drive the physical pins (315) associated with the Flash interface. The command sequence instructions (e.g., obtained from the first WCS table (304)) may omit an index to the physical command table (i.e., the second WCS table (305)) if the command sequence instruction executes local control only (i.e., it is internal-only and stays internal to NAND Flash interface controller (300)) and does not affect the Flash physical interface (315).

As shown in this figure, in some embodiments, a sequencing table (e.g., referred to in step 200 and 202 of FIG. 2) includes: (1) a first writable control store (WCS) table of command sequences (e.g., 304) and (2) a second WCS table of physical command instructions (e.g., 305); obtaining the instruction sequence includes: accessing the first WCS table of command sequences, at a first index included in the one or more selected firmware instructions, to obtain a second index in the second WCS table of physical command instructions; accessing the second WCS table of physical command instructions at the second index to obtain one or more physical command instructions; and outputting the obtained instruction sequence includes using the one or more physical command instructions that are located at the second index in the second WCS table of physical command instructions.

In some such embodiments, accessing the first WCS table of command sequences, at the first index included in the one or more selected firmware instructions, further includes: obtaining an internal-only command sequence; and in response to obtaining the internal-only command sequence: indication of whether the step of accessing the second WCS table of physical command instructions is to be skipped; and the step of outputting the obtained instruction sequence skip instruction.

In some embodiments, the command sequencer (303) rearranges a sequence or order of (firmware) commands so that the order in which commands are output to the physical sequencer (306) does not necessarily match the order in which they are received from the pre-sequence execution checker (311). This, for example, may be set using the first WCS table (304) and may depend upon the state information (309).

The post-sequence update condition checker (313) uses the post-sequence update table (314) to determine which state variables in the firmware status queue (316) should be updated, and the value of the update. The firmware status queue (316) is how the hardware (300) updates the firmware (302b) on the status of commands that were sent by the firmware (302a) to the firmware command queues (310). The post-sequence update table (314) is programmed by firmware (302a/302b). For example, different NAND Flash memory device manufacturers may have different variables (e.g., register locations) that need to be updated and/or updated with different update values. In another example, the firmware (302a/302b) is in a debug mode and wants more information returned to it when an update is performed. This is an example of post-sequence step 212 in FIG. 2.

As described in the above example, in some embodiments, the conditions table includes a post-processing condition that includes: (1) a status update location that is specific to the storage media device and (2) a status update value that is specific to the storage media device; and the hardware is further configured to update the status update location with the status update value, as specified by the post-processing condition.

As described in the above example, in some embodiments, the conditions table includes a post-processing condition that includes: (1) a debug-related update location and (2) a debug-related update value, wherein in the event firmware is in a debug mode, the firmware enables the post-processing condition. The hardware is further configured to update the debug-related update location with the debug-related update value, as specified by the post-processing condition.

With these three stages and/or types of table-based condition checking (i.e., at pre-sequence queue selector (308), pre-sequence execution checker (311), and post-sequence update checker (313)), the storage controller that includes the firmware (302a/302b) and NAND Flash interface controller (300) permits and/or enables:

1) Firmware commands to be executed when the NAND Flash memory device (e.g., 106 in FIG. 1) is free.
2) Firmware commands to interrupt other executing commands as (e.g., statically) programmed. For example, some NAND Flash memory device manufacturers permit an erase operation (to the NAND Flash memory device) to be interrupted by other commands or operations. The command sequencer (303) can be configured using the first WCS table (304) to permit a command that follows an erase to interrupt the earlier erase. This sequencing is enabled using the pre-sequence queue selector (308) to allow another command (e.g., to a same die) to go through or otherwise be forwarded when an erase command is ongoing.
3) Dynamically changing the behavior of new commands in the firmware command queues (310) based on currently executing commands or recently executed commands to other NAND Flash (e.g., via a die current state table in the state information (309)). For example, the pre-sequence execution checker (311) allows the same command in a (e.g., selected) queue to either be issued or wait based on the preceding command issued to the other dies as programmed in the pre-sequence execution table (312).

To put FIG. 3 into context with FIG. 2, pre-sequence queue selector (308) is an example of a module that selects firmware instruction(s) at step 200 in FIG. 2; pre-sequence execution checker (311) is an example of a module that determines handling of those firmware instruction(s) at step 202 in FIG. 2; command sequencer (303) is an example of a module that obtains an instruction sequence at step 208; and physical sequencer (306) is an example of a module that outputs an instruction sequence at step 210 in FIG. 2.

The following figures describe more detailed examples of some of the modules shown in FIG. 3.

Figure 4:
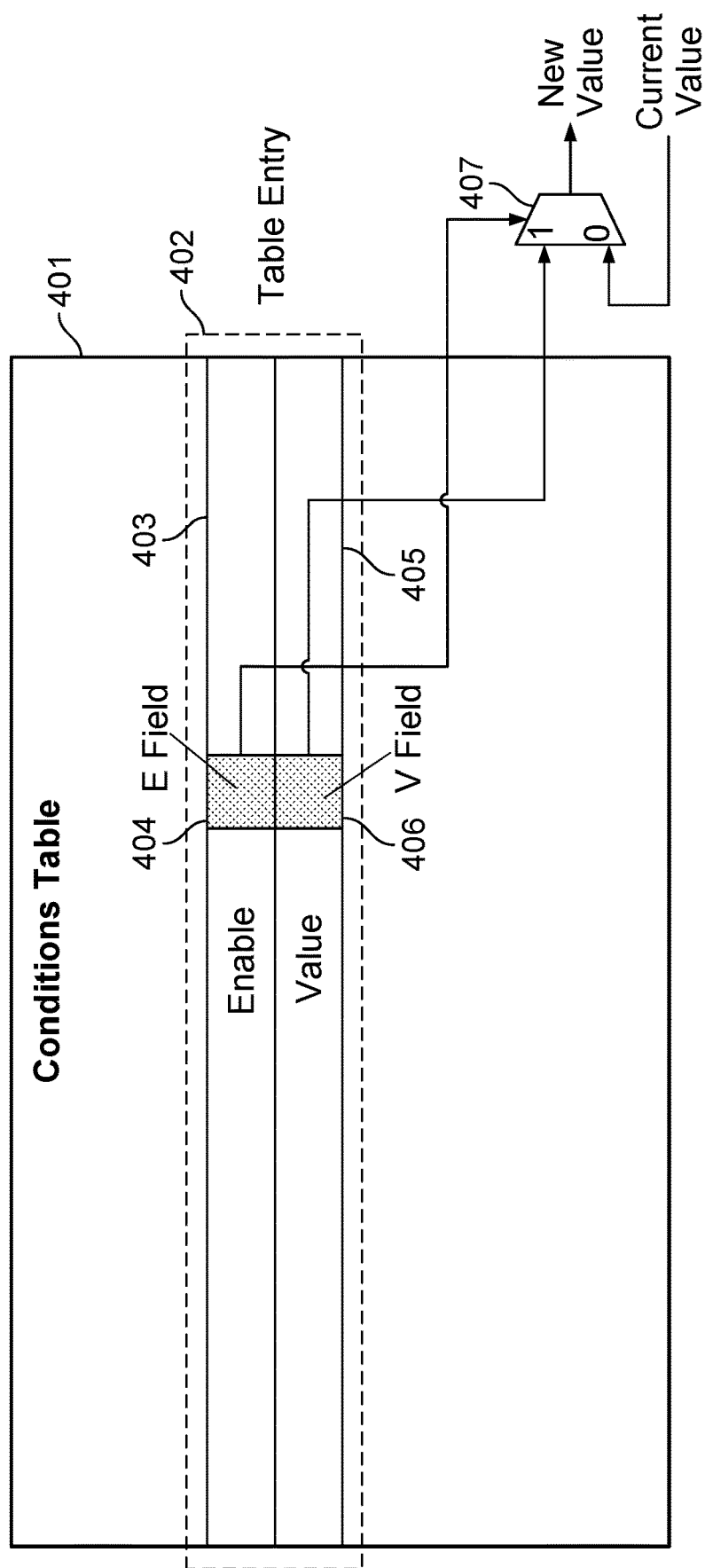
FIG. 4 is a diagram illustrating an embodiment of a conditions table.

FIG. 4 is a diagram illustrating an embodiment of a conditions table. In some embodiments, one or more of the conditions tables in FIG. 3 (e.g., pre-sequence queue table (307), pre-sequence execution table (312), and post-sequence update table (314)) are implemented as shown here. In this example, the conditions table (401) includes an array of elements (402), where each element contains an enable array (403) of enable fields or flags (404) as well as a value array (405) of values (406) that may be used for checking (e.g., perform a read and then compare the read value against the stored value (406)) or modification (e.g., writing the stored value (406)). For example, a pair of enable and value fields (404 and 406) may be used in checking and/or modifying a state variable in state information (309) in FIG. 3. When performing an update or modification, the multiplexer (407) is used to select and output the stored value (406) as the new value.

In one example, the lowest level component that is selectable or specifiable in a NAND Flash memory device is a die. One or more dies may be included on a chip. One or more chips may share a bus. A conditions table (401) can be used to select or otherwise specify the die, chip, and/or bus of interest. The enable field (404) is used to enable the corresponding value field (406). The value field (406) specifies the condition that the checker (e.g., pre-sequence queue selector (308), pre-sequence execution checker (311), and/or post-sequence update checker (313) in FIG. 3) looks for. For example, this allows the hardware (e.g., 300 in FIG. 3) to make decisions based on die-level controls or chip-level controls which are pre-programmed (if desired). A pseudo-code example is shown below using die-based information as an example. Each of the DIEBASEDMASK, DIEBASEDVALUE and CURRENTSTATE are multiple bit variables in the range of 32 bits, 40 bits, or 64 bits.

DIEBASEDMASK is used to select if a particular CURRENTSTATE bit(s) is/are to be considered in the decision making.

DIEBASEDVALUE is used to compare with CURRENTSTATE to make a success or fail decision.

```
If (DIEBASEDMASK(n)=1) then
   if (DIESTATE(n)==DIEBASEDVALUE(n)) then
      sequence check/update pass
   else if (DIEBASEDMASK(n)=0) then
      ignore field check (n) in CURRENTSTATE variable.
end
```

Returning briefly to the example of FIG. 3, all of the tables in the exemplary NAND Flash interface controller (i.e., the WCS tables (304 and 305) and the condition tables (307, 312, and 314)) are pseudo-static; that is, under normal operation conditions, their contents are not dynamically altered while the functions they control are in a non-quiescent state. Static tables provide the flexibility to implement different models of interaction between the firmware and the Flash by statically altering the contents of the tables.

Figure 5:
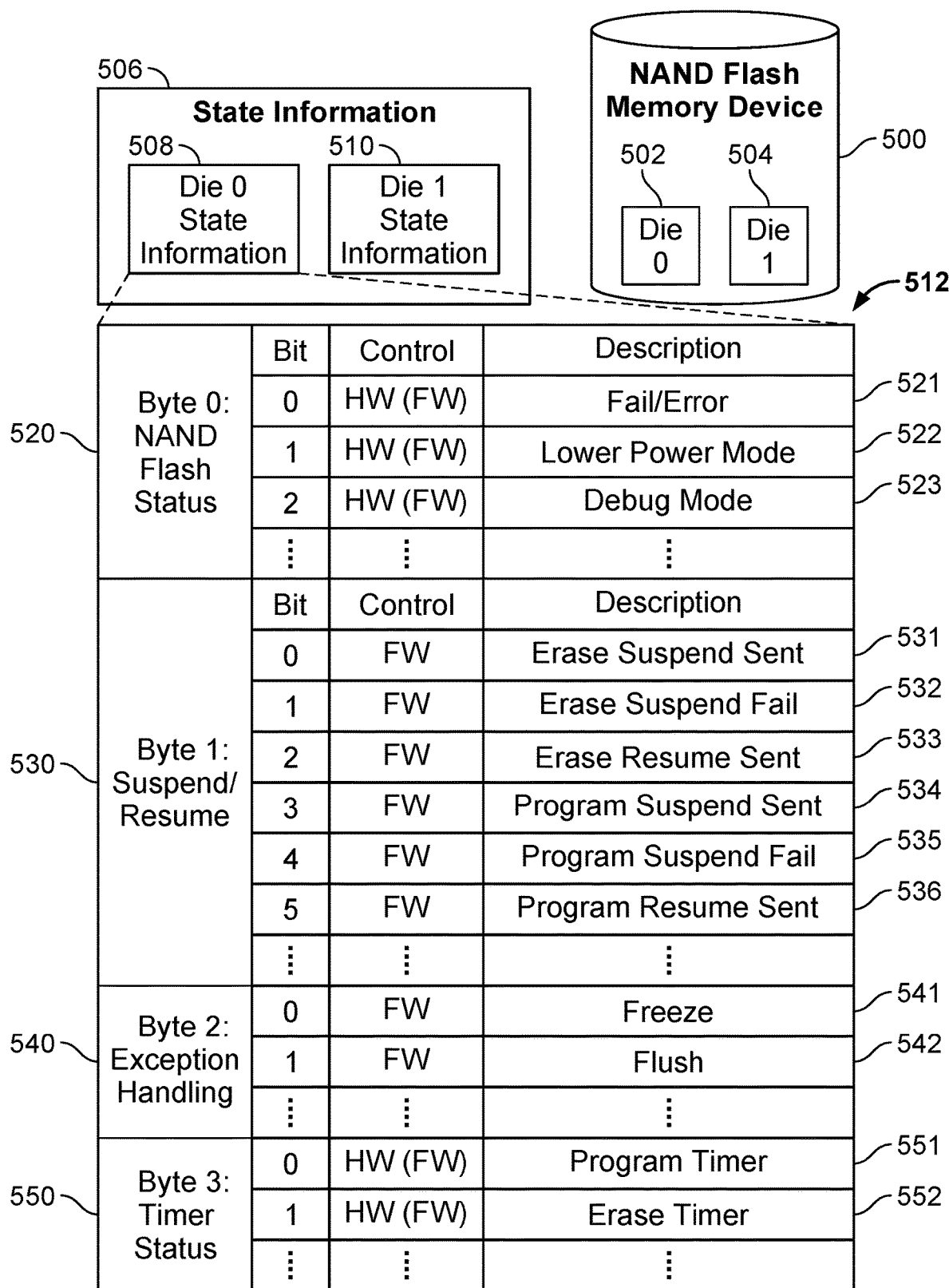
FIG. 5 is a diagram illustrating an embodiment of state information that includes state information associated with a plurality of dies in a NAND Flash memory device.

FIG. 5 is a diagram illustrating an embodiment of state information that includes state information associated with a plurality of dies in a NAND Flash memory device. In some embodiments, the state information (309) in FIG. 3 is implemented as shown here. In this example, a NAND Flash memory device (500) includes two dies: a first die (502) with a die index of 0 and a second die (504) with a die index of 1. Depending upon the manufacturer, the dies (502 and 504) may in some embodiments be able to perform operations and/or instructions in a (semi-)independent manner.

To help the storage controller ensure that instructions are sent to the two dies at permitted and/or performance-optimizing states or times, the state information (506) shown here includes die state information (508) for the first die with an index of 0 (502) and the die state information (510) for the second die with an index of 1 (504).

Diagram 512 shows the die state information (e.g., 508) in more detail. In this example, the first byte (520) is associated with the NAND Flash status. In this example, the first bit (521) is used to indicate if that die is in an exception (e.g., fail or error) state, the second bit (522) is used to indicate if that die is in a low power mode, and the third bit (523) is used to indicate if that die is in a debug mode.

For example, the exception bit (521) may be used to pause or stop sending new instructions to the die, the low power mode bit (522) may be used to determine if the storage controller needs to "wake up" the die before sending any new instructions to the die, and the debug mode bit (523) may let the storage controller know that the die has reported additional, debug information that is normally not reported (e.g., so the storage controller knows there is additional, debug information that may be used in its decision making).

In this example, the NAND Flash status byte (520) is controlled primarily or mostly by hardware (i.e., the NAND Flash interface controller) but firmware can also control this byte if needed (e.g., if there is an issue with the hardware). For example, both dies (502 and 504) have a 1-byte status that they return to the hardware (i.e., the NAND Flash interface controller); the hardware puts this status byte in this first byte (520), for example, for firmware to read.

The second byte (530) is associated with suspend and resume operations. In this example, the dies (502 and 504) have the ability to perform a suspend command where the instructed die suspends execution of a command that the die was in the middle of executing. For example, erase (i.e., clear) and program (i.e., write) operations take a relatively long time on NAND Flash storage media and therefore the exemplary dies (502 and 504) permit suspension of the erase and program operations. Bits 531 and 534 are used to indicate that a suspend command has been sent (e.g., by firmware) for an erase and a program command, respectively. Bits 532 and 535 are used to indicate a failure of the suspend command for an erase and a program command, respectively. Bits 533 and 536 are used to indicate that a resume command has been sent (e.g., by firmware) to resume an erase or program operation, respectively, that was previously suspended. In this example, this byte (530) is controlled and/or written by firmware.

The third byte (540) is associated with exception handling and will be described in more detail below. In this example, the first bit (541) is a freeze bit for exemplary die 0 and the second bit (542) is a flush bit for exemplary die 0. In this example, this byte (540) is controlled and/or written by firmware.

The fourth byte (550) is used for various timers. In this example, the manufacturer of the dies (502 and 504) has specified that program and erase operations take a certain, non-negligible amount of time. The program timer bit (551) and erase timer bit (552) are used to indicate when the program timer and erase timer have stopped, indicating that the required or specified amount of time to perform those operations has passed. In this example, these timers are started and monitored by hardware and this byte is normally controlled by hardware, but is writeable and/or controllable by firmware, if needed (e.g., the hardware gets "stuck" or is in an exception state).

For example, without the timer status byte (540), the storage controller may have to continually send "check status" commands to the die and the die may have to return status information in response. This is inefficient (e.g., it consumes communication channel resources, as well as resources at the storage controller and die) and using hardware-managed timers whose states are reported in the timer status byte is more efficient.

The state bits and/or variables shown in diagram 512 are merely exemplary and what state information is reported as well as the usage and/or interpretation of said state information are configurable and/or adjustable by firmware, as desired. This configurability permits the storage controller to be able to adapt to the timing, supported operations, and/or rules of different die manufacturers.

As is shown in this example, in some embodiments, the storage media device (500) supports a suspend command that permits suspension of one or more of the following: a program command or an erase command; the state information includes suspend-related state information (see, e.g., byte 1 (530)); the conditions table includes suspend-related condition information; and determining how to handle the one or more selected firmware instructions includes comparing the suspend-related state information and the suspend-related condition information. The suspend-related state information includes, for example, state information associated with resuming a suspended command (see, e.g., the erase resume sent bit (533) and the program resume sent bit (536)).

As is shown in this example, in some embodiments, the state information includes timer-related state information; the conditions table includes timer-related condition information; and determining how to handle the one or more selected firmware instructions includes comparing the timer-related state information and the timer-related condition information. In some such embodiments, a timer associated with the timer-related state information begins counting in response to one or more of the following: a program command or an erase command (see, e.g., byte 3 (540)).

The following figure shows a more detailed example showing table-based decision making at various modules in a NAND Flash interface controller associated with suspension of an erase command.

Figure 6:
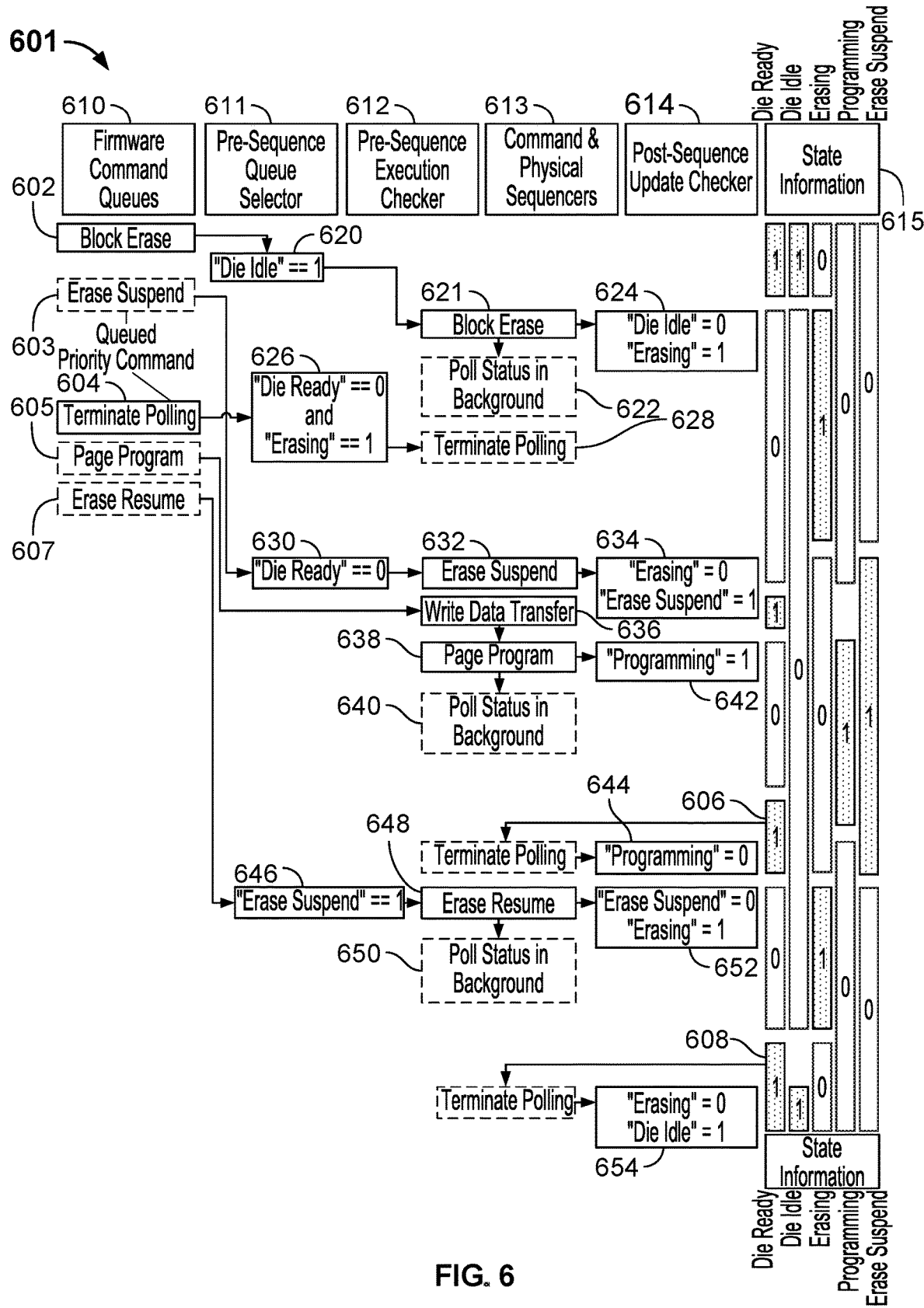
FIG. 6 is a diagram illustrating an embodiment where an erase operation is conditionally suspended so that a program operation can be executed, and then the suspended erase operation is resumed when the program operation is completed.

FIG. 6 is a diagram illustrating an embodiment where an erase operation is conditionally suspended so that a program operation can be executed, and then the suspended erase operation is resumed when the program operation is completed. In this example, the firmware command queues (610) correspond to the modules of the same name (310) in FIG. 3, pre-sequence queue selector (611) corresponds to the module of the same name (308) in FIG. 3, pre-sequence execution checker (612) corresponds to the module of the same name (311) in FIG. 3, command and physical sequencers (613) correspond to the modules of the same name (303 and 306) in FIG. 3, post-sequence update checker (614) corresponds to the module of the same name (313) in FIG. 3, and state information (615) corresponds to the module of the same name (309) in FIG. 3. For clarity and/or brevity, some exception handling and robustness enhancements and/or features are not necessarily described in this example.

In this example, each page program (e.g., 605) is always preceded by an erase suspend command (e.g., 603) and is followed by an erase resume command (e.g., 607) as shown in the firmware command queues (610) in diagram 601. If an erase suspend is not applicable and/or is not needed at the point in time it is to be executed, it is simply discarded; if it is applicable and/or needed, then the erase suspend is executed. This discard and execution decision is done by the pre-sequence execution checker module (e.g., 311 in FIG. 3 or 612 here). (As described above, the erase suspend may be issued by firmware (e.g., 302a/302b in FIG. 3) which is slow and/or has very coarse timing resolution but the decision about whether to actually execute the erase suspend is performed by hardware (e.g., 300 in FIG. 3) which is much faster and/or has finer timing resolution.) The erase suspend execution (e.g., if or when performed) is marked or otherwise indicated by an update to the relevant variable in the state information (e.g., 309 in FIG. 3 or 615 here).

In this example, the command that follows the page program command (605) is an erase resume command (607). This erase resume command (where suspending and/or resuming may be a feature that is not necessarily supported by other, older systems) examines the state set (e.g., in the state information (615)) by the erase suspend. A decision is made (e.g., by pre-sequence execution checker (e.g., 311 in FIG. 3 or 612 here)) about whether to execute or skip the erase resume command. If it is decided to execute the erase suspend command, then it is also decided to execute the erase resume command. Naturally, if it is decided to not perform or otherwise execute the erase suspend, then likewise the erase resume command does not need to be performed and is skipped (e.g., for efficiency and/or to preserve system resources). This dynamic behavior is completely managed by setting and checking the appropriate values in the state information. For example, the pre-sequence execution checker (612) checks the pre-sequence execution table (e.g., 312 in FIG. 3) and the post-sequence update checker (614) checks the post-sequence update table (e.g., 314 in FIG. 3) and examines and updates various bits in the state information (615), as indicated and/or specified. The execution of these commands in the right order and selection from the multiple firmware command queues (310) are done by the pre-sequence queue selector (611) according to the pre-sequence queue table (e.g., 307 in FIG. 3).

The following describes the sequence shown in FIG. 6.
1. Firmware command: block erase (602)
   a. Pre-sequence queue selector (611): is "die idle" (615) asserted? (620) (in this example, yes)←note that this is a low priority command, only executed if the die is idle
   b. Main sequence→physical sequencer (613): issue block erase command (621)
   c. Main sequence: start status polling in background (622)
   d. Post-sequence update checker (614): clear "die idle" (615) state and set "erasing" (615) state (624)
2. Firmware command: erase suspend (queued) (603) ←note that this queued command is not immediately executed
3. Firmware command in priority queue: terminate status polling (604)
   a. Pre-sequence execution checker (612): is "erasing" (615) asserted and "die ready" (615) not asserted? (626) (in this example, yes)←this check automates the case where the erase has completed already and does not need to be suspended
   b. Main sequence→physical sequencer (613): terminate status polling (628)←not executed if erasing has already completed
4. Firmware command: page program (queued) (605) ←note that this queued command is not immediately executed
5. Firmware command: erase resume (queued) (607) ←note that this queued command is not immediately executed)
6. Queued command: erase suspend (603)
   a. Pre-sequence execution checker (612): is "die ready" (615) not asserted? (630) (in this example, yes)←not executed if erasing has already completed (and thus die is no longer busy)
   b. Main sequence→physical sequencer (613): issue erase suspend command (632)
   c. Post-sequence update checker (614): clear "erasing" (615) state and set "erase suspend" (615) state (634)
7. Queued command: page program (605)
   a. Main sequence→physical sequencer (613): issue write data transfer command (636)
   b. Main sequence→physical sequencer (613): issue page program command (638)
   c. Main sequence→physical sequencer (613): start status polling in background (640)
   d. Post-sequence update checker (614): set "programming" (615) state (642)
8. NAND Flash die completes programming and sets its "die ready" (615) status (606)
   a. Main sequence→physical sequencer (613): status polling (640) completes
   b. Post-sequence update checker (614): clear "programming" (615) state (644)
9. Queued command: erase resume (607)
   a. Pre-sequence execution checker (612): is "erase suspended" (615) asserted? (646) (in this example, yes)
   b. Main sequence→physical sequencer (613): issue erase resume command (648)
   c. Main sequence→physical sequencer (613): start status polling in background (650)

d. Post-sequence update checker (614): clear "erase suspend" (615) state, set "erasing" (615) state (652)

10. NAND Flash die completes erasing and sets its "die ready" (615) status (608)

a. Main sequence→physical sequencer (613): status polling (650) completes b. Post-sequence update checker (614): clear "erasing" (615) state and set "die idle" (615) state (654)

It is noted that the meaning and/or interpretation of the table-based conditioning, table-based sequencing, and/or state information is/are programmable by firmware and is therefore flexible so that a variety of storage media devices (e.g., with different timing rules, different supported operations, etc.) can be supported. Although not described above, other (e.g., more complex) sequences may be supported through the manipulation and testing of additional state element(s). Examples of these sequences include: exception handling cases; suspending NAND Flash program operation to read data from the NAND Flash die, and so on.

As described above, in some embodiments, a decision is made by (for example) the pre-sequence queue selector (611) or the pre-sequence execution checker (612) to skip (i.e., discard or not execute) a firmware command. The following figure shows an example of a signal path associated with skip reporting (e.g., so that firmware knows when a command is skipped and can re-issue the command, as or if needed).

Figure 7:
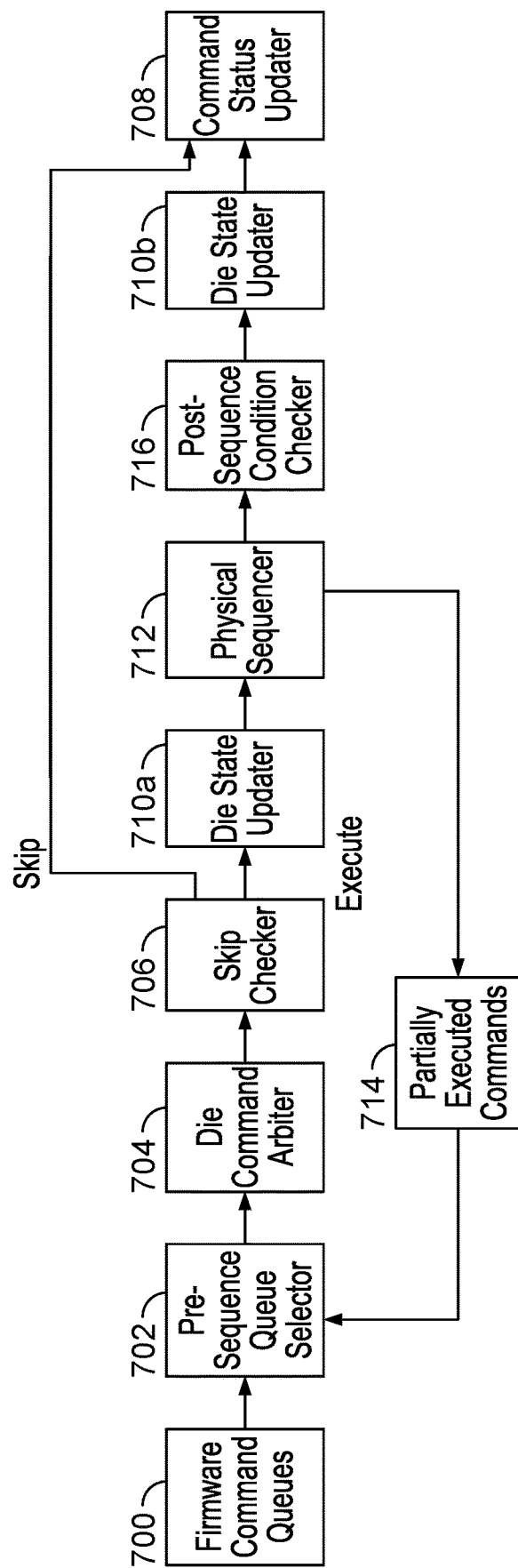
FIG. 7 is a diagram illustrating an embodiment of a signal path in a NAND Flash interface controller associated with command or operation skipping.

FIG. 7 is a diagram illustrating an embodiment of a signal path in a NAND Flash interface controller associated with command or operation skipping. In this example, the modules shown are part of a NAND Flash interface controller (i.e., hardware) in a storage controller. This diagram shows an example of modules that perform skip-related step 206 in FIG. 2.

In this example, firmware commands are stored in the firmware command queues (700). The pre-sequence queue selector (702) selects a next queue, as described above (e.g., using a pre-sequence queue table). The die command arbiter (704) arbitrates or otherwise selects one or more firmware commands from the selected firmware command queue based on the (e.g., state of the) dies in the storage media device. For example, the die command arbiter may decide that for performance reasons it wants to send multiple read commands to the same die together and/or successively and so arbitrates in favor of the read commands. As used herein, arbitration is the act of selecting and/or prioritizing without discarding, so any firmware commands that are not selected by the die command arbiter (704) remain in their queue.

In contrast, the skip checker (706) decides whether or not to skip (i.e., discard) versus execute the firmware commands that are passed to it by the die command arbiter (704). If the skip checker (706) decides to skip the firmware command(s), then the signal path from the skip checker (706) to the command status updater (708) is used. For example, the command status updater (708) may provide updates about the commands that are queued in the firmware command queues (700) via firmware status queues (e.g., that correspond to the input queues). In FIG. 6, for example, an erase suspend command would be skipped if the erase had already finished by the time the erase suspend command was being contemplated and in that scenario the erase suspend command would be skipped. Likewise, if the erase suspend command were skipped, then a later-queued erase resume command would similarly be skipped. Information about the skipped erase suspend command and/or erase resume command could be passed to firmware via the path from the skip checker (706) to the command status updater (708).

If the skip checker (706) decides to execute the firmware command(s) that are passed to it by the die command arbiter (704), then control passes to the die state updater (710*a*). For example, die state updater (710*a*) updates the state information associated with the relevant die to reflect the firmware commands which are about to be performed by that die. In the example of FIG. 6, the "die idle" and "erasing" states are updated (624) by the die state updater (710*a*). The update location and/or update value by the die state updater (710*a*) may be specified and/or controlled via a table.

The physical sequencer (712) then obtains the physical command sequences and drives the NAND Flash physical interface pin controls (e.g., per table-based sequencing) as described above. Any partially executed commands (714) are sent back from the physical sequencer (712) to the pre-sequence queue selector (702) so they have an opportunity to be completed. A command may be partially executed if it allows a second command to be issued while the first command is being executed.

After the physical sequencer (712) is the post-sequence condition checker (716) which checks and/or ensures that the firmware commands have been (e.g., fully) executed and the state information is in some expected and/or completed state. If so, the die state updater (710*b*) updates the relevant state information associated with the relevant die to reflect completion of the executed firmware commands. In the example of FIG. 6, the "programming" state is updated to zero (644) by the die state updater (710*b*) when the Page Program operation (638 and 640) completes. The "executed" path then rejoins the "skipped" path at the command status updater (708) which (for example) informs firmware about the completion of the executed firmware commands (e.g., which followed the "executed" path described above).

As described above, in some embodiments, some of the (e.g., table-based conditioning) techniques and/or systems described above may be used during handling of exception cases (e.g., when one of the dies (502 and 504) in FIG. 5 asserts an exception flag). As described above, storage controllers sometimes need to support a range of storage media devices with a range of behaviors that can vary between specific components and/or manufacturers. In some other storage systems, if an exception occurs (e.g., the storage media device or the NAND Flash interface controller asserts an exception flag or register), other types of firmware (i.e., those types which do not perform the techniques described herein) reset at least some part of the NAND Flash interface controller (i.e., hardware in the storage controller). This is very undesirable because resetting any part of the hardware (300) can cause long idle periods which disrupts the flow of traffic and are detrimental to system performance. For example, the firmware may not know what command the NAND Flash memory device was performing and whether that command was completely or partially executed. It may be a time-consuming process to determine the state of the NAND Flash memory device and/or which firmware commands were not executed, partially executed, or fully executed.

Another recovery tactic available to other types of storage controllers (i.e., types which do not perform the techniques described herein) is to wait for the hardware in the storage controller to execute the already-queued firmware commands (i.e., that were issued before the exception occurred) so that the hardware can eventually execute firmware commands that deal with the exception. This solution is undesirable because it may be very time consuming to process the already-queued firmware commands (especially when there is an exception) and in some cases the controller may be unable to process the already-queued firmware commands in front of the recovery-related commands.

There is therefore a need for an improved storage controller which is better able to handle exception cases. The following figures describe some storage controller embodiments showing how exception cases may be handled in a cleaner and/or faster manner than previously could be performed.

Figure 8:
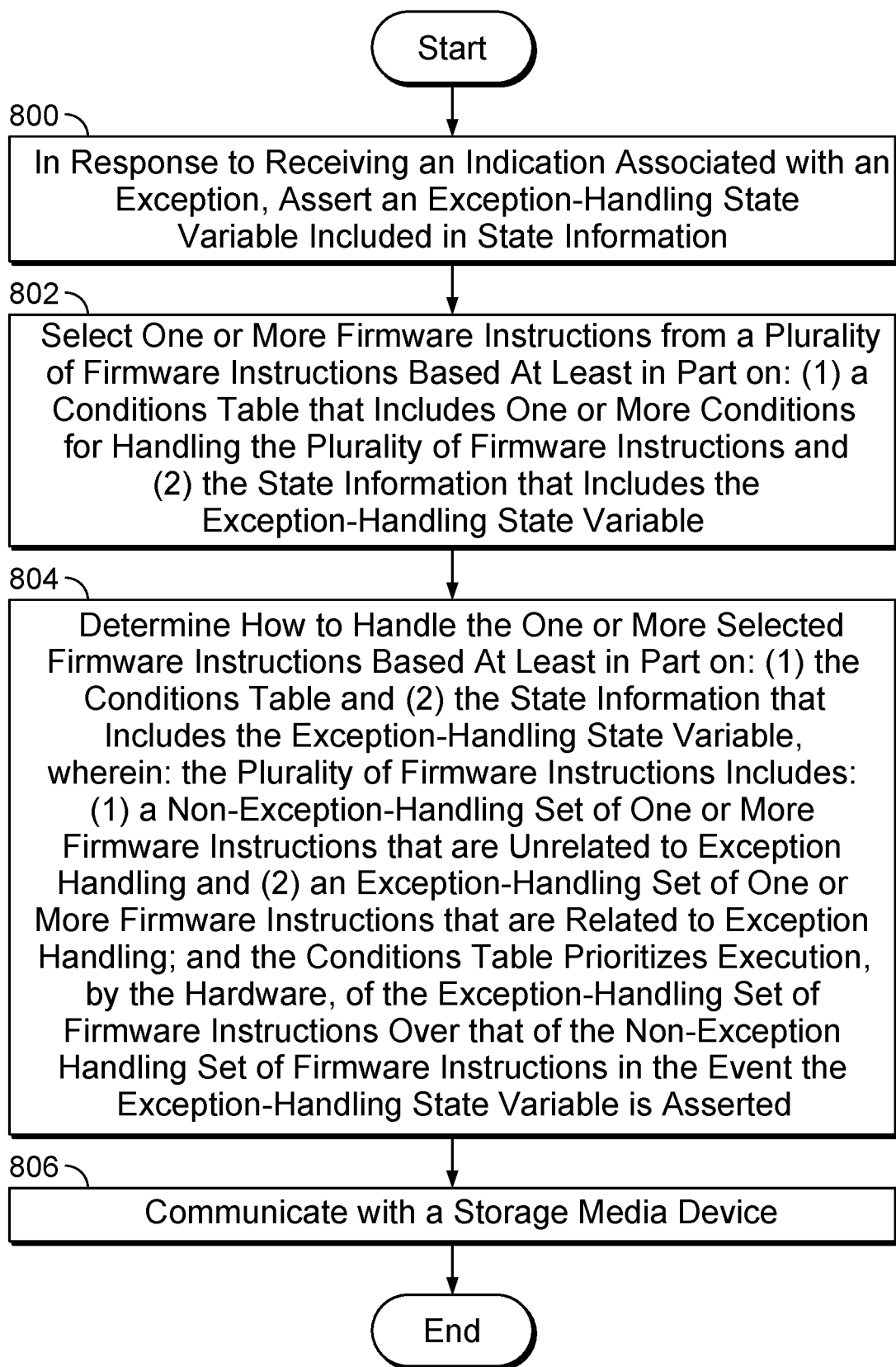
FIG. 8 is a flowchart illustrating an embodiment of exception-handling using a conditions table.

FIG. 8 is a flowchart illustrating an embodiment of exception-handling using a conditions table (e.g., 108 in FIG. 1). In one example, the process of FIG. 8 is performed by the storage controller (100) in FIG. 1 which manages access to a NAND Flash memory device (106).

At 800, in response to receiving an indication associated with an exception, an exception-handling state variable (e.g., 521 in FIG. 5) included in state information (e.g., 508, 510 in FIG. 5) is asserted. For example, firmware may assert (e.g., change the value from 0 to 1) the freeze bit (541) and/or the flush bit (542) in the exception handling byte (540) in the exemplary state information (512).

At 802, one or more firmware instructions are selected from a plurality of firmware instructions based at least in part on: (1) a conditions table that includes one or more conditions for handling the plurality of firmware instructions and (2) the state information that includes the exception-handling state variable. For example, the pre-sequence queue selector (308) in FIG. 3 may perform step 802. The pre-sequence queue table (307) may specify queue selection priorities, orders, and/or rules for when the exception-handling state variable is not asserted (e.g., queue selection priorities, orders, and/or rules for regular-handling) as well as queue selection priorities, orders, and/or rules for when the exception-handling state variable is asserted (e.g., queue selection priorities, orders, and/or rules for exception-handling).

At 804, it is determined how to handle the one or more selected firmware instructions based at least in part on: (1) the conditions table and (2) the state information that includes the exception-handling state variable, wherein: the plurality of firmware instructions includes: (1) a non-exception-handling set of one or more firmware instructions that are unrelated to exception handling and (2) an exception-handling set of one or more firmware instructions that are related to exception handling; and the conditions table prioritizes execution, by the hardware, of the exception-handling set of firmware instructions over that of the non-exception-handling set of firmware instructions in the event the exception-handling state variable is asserted.

In one example of step 804, a storage media device includes a plurality of dies and one of them is in an exception state. In some embodiments, the exception-handling set of firmware instructions includes a reset instruction directed to the die in the exception state. In some embodiments, firmware first assesses the state of the die in the exception state before issuing any reset instruction because resetting the die is an extreme and/or drastic step that may result in data loss.

In another example of step 804, step 804 may be performed by a pre-sequence execution checker (311) in FIG. 3 and the pre-sequence execution table (312) may include non-exception-handling rules as well as exception-handling rules. The exception-handling rules may include skipping, suspending, and/or interrupting an instruction from the non-exception-handling set of firmware instructions so that the hardware can more quickly get to the exception-handling set of firmware instructions.

At 806, a storage media device is communicated with. In FIG. 3, for example, physical sequencer (306) drives the physical pins (315) associated with the Flash interface, based on instructions from the command sequencer (303). With other types of storage controllers (i.e., those that do not perform the techniques described herein), an observer at the physical pins (315) would notice that some non-exception-handling instructions or commands to the storage media device may be interrupted when the firmware resets the hardware in response to an exception. This is undesirable because recovering from the hardware reset is time consuming.

In contrast, with the techniques and/or systems described herein, firmware can (e.g., asynchronously) assert the exception-handling state variable, and firmware will subsequently prioritize (e.g., synchronously) exception-handling firmware instructions over non-exception-handling firmware instructions in an orderly and/or graceful manner. Another way to describe this is that non-exception-handling firmware instructions that are mid-execution are permitted to complete (or at least get to a graceful exit or pause point) when the exception-handling state variable is asserted (at least in some embodiments). The next time the hardware selects a queue (e.g., at pre-sequence queue selector (308) in FIG. 3) or decides how to handle a selected firmware instruction (e.g., at pre-sequence execution checker (311) in FIG. 3), the hardware will prioritize exception-handling firmware commands over non-exception-handling firmware commands because of the asserted exception-handling state variable (e.g., 309 in FIG. 3) and the relevant tables (e.g., 307, 312 and/or 314 in FIG. 3) that was consulted.

Some other types of storage controllers (i.e., those which do not perform the techniques described herein) provide hardware assistance for exception handling, but these other solutions are hardcoded to perform specific, pre-identified function(s) only. It is noted that due to the nature of the table-based conditioning, the technique described herein is much more flexible. The technique can, for example, be used to adapt to unanticipated and/or new exception flag locations or values, and respond to the exception in a variety of ways that are adaptable. For example, some exception handling may require freezing certain types of non-exception-handling instructions while flushing (i.e., skipping) other types of non-exception-handling instructions, and the adaptable nature of the techniques and systems described herein permit flexibility should non-exception-handling instruction move from the freeze category to the flush category.

In some embodiments, any of steps 800, 802, 804 and 806 is performed by hardware (e.g., a NAND Flash interface controller) in a storage controller that is implemented on an SOC. As described above, in some embodiments, the hardware includes one or more of the following: an application-specific integrated circuit (ASIC) or a field-programmable gate array (FPGA).

Figure 9:
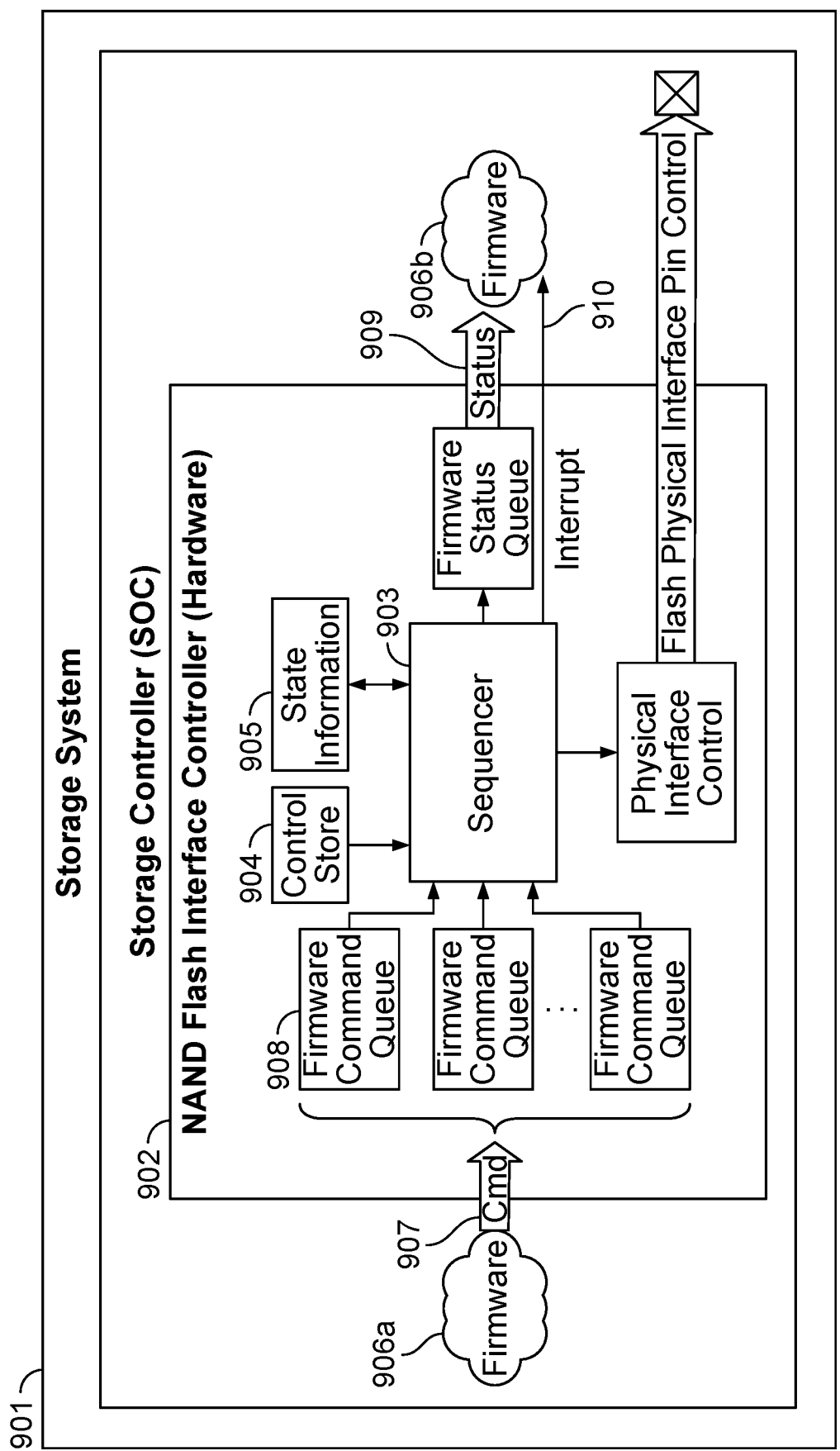
FIG. 9 is a diagram illustrating an embodiment of a storage controller that performs exception handling using state information that includes the exception-handling state variable.

FIG. 9 is a diagram illustrating an embodiment of a storage controller that performs exception handling using state information that includes the exception-handling state variable. For simplicity and ease of explanation, a simplified NAND Flash interface controller (902) is shown in which implementation details shown in the above examples may be incorporated. To put it another way, in some embodiments, some of the system components and/or features described above (e.g., for normal handling) are used to support exception handling.

In this example, the NAND Flash interface controller (902) is part of a storage system (901) that includes a sequencer (903) (e.g., in hardware) that executes instructions from a programmable control store (904). The instructions include an ability to examine (e.g., read and compare against some other value) and modify state information (905) which includes one or more state variables. In some embodiments, at least some of the state variables can also be modified and examined by firmware (906a/906b) executing on the storage system (901).

As will be described in more detail below, the state information (905) includes one or more exception-handling state variables (e.g., comprising one or more bits) and the control store (904) includes (e.g., programmable and/or configurable) instructions for what the sequencer (903) should do when the exception-handling state variable is asserted (e.g., has a value of 1) or is not asserted (e.g., has a value of 0).

To put FIG. 9 into context with FIG. 3, in some embodiments, the sequencer shown here (903) includes the pre-sequence queue selector (308), the pre-sequence execution checker (311), the command sequencer (303), the physical sequencer (306), and the post-sequence update checker (313) from FIG. 3.

Figure 10:
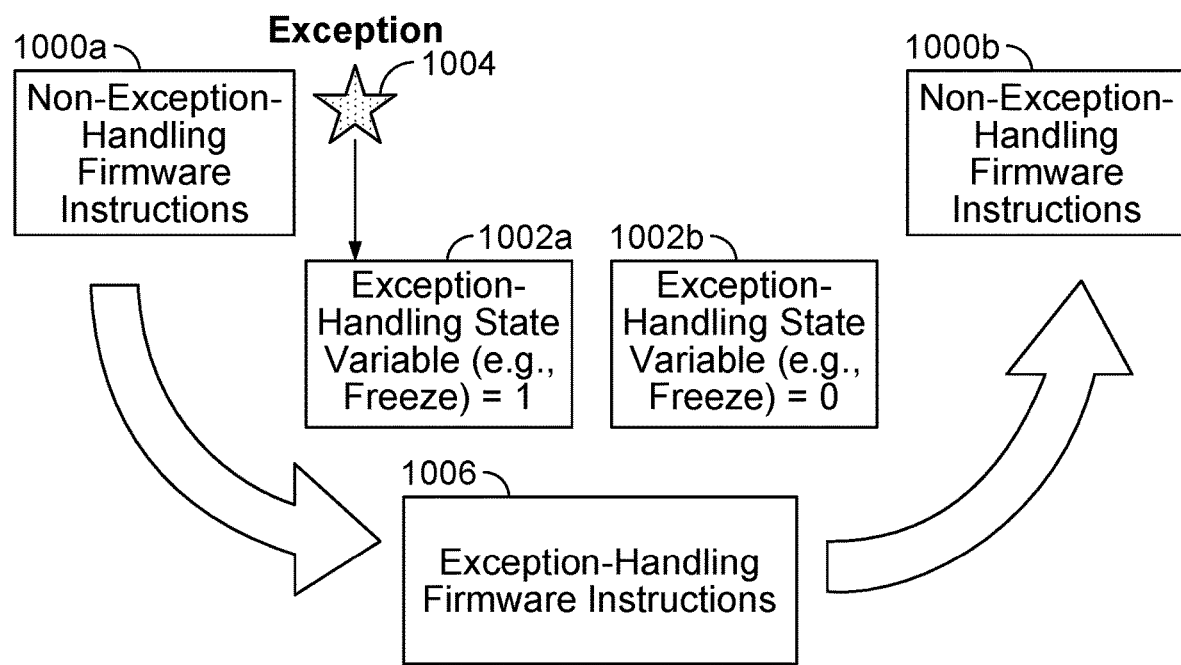
FIG. 10 is a diagram illustrating an embodiment of non-exception-handling firmware instructions that are paused in favor of exception-handling firmware instructions.

FIG. 10 is a diagram illustrating an embodiment of non-exception-handling firmware instructions (1000a and 1000b) that are paused in favor of exception-handling firmware instructions (1006). In this example, the exception-handling state variable (1002a) (e.g., referred to in the process of FIG. 8) is a freeze bit (e.g. 541 of FIG. 5). In this example, an exception-handling state variable is maintained for each NAND Flash component entity (for example, a die, logical unit, or wordline). In some embodiments, an exception-handling state variable is maintained for an entity aggregator such as a collection of component entities, or the physical interface to the storage media device.

FIG. 5 shows an example of this where there are two die (502 and 504) in the NAND Flash memory device (500) so that there are two sets of die state information (508 and 510) and each has its own exception handling byte (540) so that exception handling for the two die can be managed and/or performed independently of the other die.

In FIG. 9, the sequencer (903) executes instructions in response to commands (907) issued by firmware (906a) executing in the storage system (901). The commands (907) include arguments used in the execution of the commands and may include an argument dictating the first instruction that the sequencer (903) uses to process the command. The firmware may issue commands such that there are multiple commands concurrently available for processing by the sequencer (i.e., there are multiple commands outstanding). In this example, commands are placed in a plurality of firmware command queues (908), from which any can be selected for processing by the sequencer (903).

Before executing a selected firmware instruction, the sequencer (903) examines the relevant state variables in the state information (905) that are associated with the command or with the instruction; the relevant state variables may be any of the variables associated with a component entity, an aggregate of entities, or any combination of such variables, depending on the arguments associated with the command or instruction.

In FIG. 10, execution of the non-exception-handling firmware instructions (1000a) is deferred if the exception-handling state variable (1002a and 1002b), which in this example is a freeze bit, is in the asserted state. For example, exception event (1004) occurs, causing firmware to assert the freeze bit (i.e., set the freeze bit to 1). In response to the assertion of the freeze bit, the non-exception-handling firmware instructions (e.g., which were issued before the exception event (1004) and were pending in the firmware command queues (908) in FIG. 9) are (as an example) not selected and/or executed by hardware so that the exception-handling firmware instructions (1006) can instead be prioritized and/or performed by the hardware.

In FIG. 9, for example, the exception-handling firmware instructions may be put into an empty one of the firmware command queues (908) and that newly-filled queue is prioritized (e.g., during queue selection) by the hardware over the other queues. In some embodiments, there are no empty firmware command queues (908) and the sequencer (903) is instructed (e.g., using the instructions in the control store (904)) to empty or flush one of the firmware command queues (e.g., a queue with low value or easily replaceable commands) when the flush bit is asserted (i.e., set to 1) to create an empty queue to put exception-handling firmware instructions into.

Returning to FIG. 10, once all of the exception-handling firmware instructions (1006) have been performed, the freeze bit is de-asserted (1002b). In the example of FIG. 9, hardware (902) may indicate the conclusion of the exception-handling firmware instructions via a status message (909) to firmware (906b) or through the assertion of an interrupt (910) to firmware (906b). Once firmware has received confirmation that exception-handling firmware instructions (1006) have been performed and the firmware is satisfied that the storage system is able to resume regular processing, the firmware sets the value of the freeze bit to 0 (1002b).

In response to the freeze bit being de-asserted (1002b), the hardware resumes processing of the non-exception-handling firmware instructions (1000b). In FIG. 9, for example, the non-exception-handling firmware instructions, which were issued before the exception (1004) occurred, would have remained in the firmware command queues (908) until exception handling is complete and are available for immediate processing when the freeze bit is de-asserted.

In some embodiments, the exception-handling state variable (1002a and 1002b) is a flush bit (e.g., 542 in FIG. 5). With the flush bit asserted, affected non-exception-handling firmware instructions would be skipped or otherwise flushed from the system when the flush bit is asserted. At the resumptions of regular handling (e.g., when the flush bit is set to 0), affected non-exception-handling firmware instructions would no longer be present in the firmware command queues.

In the context of FIG. 7, the pre-sequence queue selector (702) may check the freeze bit and respond accordingly, as described above. As described above, the pre-sequence queue selector (702) does not discard commands but rather selects a next queue; this functionality supports the freezing technique described above. In contrast, skip checker (706) does have the ability to discard or otherwise flush out commands and is an example of a block that checks the flush bit and responds accordingly as described above.

In some embodiments, when the freeze bit is asserted (i.e., freeze=1), any non-exception-handling firmware commands that are between the skip checker (706) and the physical sequencer (712) are frozen by sending them back to the pre-sequence queue selector (702) via the partially executed commands (714) path if or when at a state or point where it is permitted and/or easy to do so. To put it another way, in some embodiments, freezing includes pausing a partially-executed command where execution of that command started when the freeze bit was not asserted.

In some embodiments, when the flush bit is asserted (i.e., flush=1), any non-exception-handling firmware commands that are at die state updater (710a) and the physical sequencer (712) are flushed by sending them back to the pre-sequence queue selector (702) via the partially executed commands (714) path if or when at a state or point where it is permitted and/or easy to do so. At those blocks, the commands have already passed by the skip path branching off from the skip checker (706). To get back to the skip path, the commands in those two modules are sent back via the partially-executed commands (714) and are then diverted to the skip path by the skip checker (706).

One example of when the flush bit may be asserted is when firmware needs to handle a system exception like a power shutdown notification from the host. In another example, hardware may set the flush bit when it receives an error from a NAND Flash memory device (e.g., because firmware cannot respond when the NAND Flash memory device is in that state).

As described above, decision making for some non-exception-handling firmware instructions may be dictated by the freeze bit (e.g., 541 in FIG. 5) and/or the flush bit (e.g., 542 in FIG. 5). Which non-exception-handling firmware instructions are controlled by which exception-handling state variable is configurable (e.g., by control store (904) in FIG. 9, or by the pre-sequence queue table (307) or pre-sequence execution table (312) in FIG. 3). In various embodiments, an exception-handling state variable may be used to skip a particular type of command, pause (e.g., defer) a particular type of command, or execute a particular type of command. To put it more generally, the techniques described herein permit firmware to (as or if desired) issue a different set of (e.g., exception-handling) commands before the previously issued (e.g., non-exception-handling) commands are processed, do cleanup before the previously issued commands are sent out to the NAND Flash memory device, and/or discard the previously issued (e.g., non-exception-handling) commands and process a different set of (e.g., exception-handling) commands. The flexibility to do any of those options is offered by the exemplary systems described herein.

As described above, in some embodiments, the storage media device includes a plurality of dies; the state information includes a plurality of die-specific state information; and each one of the plurality of die-specific state information includes a die-specific exception-handling state variable. See, for example, FIG. 5.

As described above, in some such embodiments (with die-specific exception-handling state variables), the die-specific exception-handling state variable includes a freeze bit; the firmware is further configured to put the exception-handling set of firmware instructions into a prioritized queue; and selecting the one or more firmware instructions from the plurality of firmware instructions includes: in response to the freeze bit being asserted, selecting, for a die in the plurality of dies that corresponds to the asserted freeze bit, the prioritized queue with the exception-handling set of firmware instructions over a lower priority queue with the non-exception-handling set of firmware instructions, as prescribed by the conditions table; and in response to the freeze bit being de-asserted, resuming selection of, for the die in the plurality of dies that corresponds to the asserted freeze bit, the lower priority queue with the non-exception-handling set of firmware instructions, as prescribed by the conditions table.

As described above, in some embodiments, the die-specific exception-handling state variable includes a flush bit; and determining how to handle the one or more selected firmware instructions includes: in response to the flush bit being asserted, discarding, for a die in the plurality of dies that corresponds to the asserted flush bit, the non-exception-handling set of firmware instructions that are in a queue to-be-flushed, as prescribed by the conditions table.

As described above, in some such embodiments (e.g., with a flush bit), discarding further includes selectively discarding based on instruction type so that: a first non-exception-handling firmware instruction, having a first instruction type and included in the queue to-be-flushed, is kept in the queue to-be-flushed after flushing; and a second non-exception-handling firmware instruction, having a second instruction type and included in the queue to-be-flushed, is discarded from the queue to-be-flushed after flushing. For example, depending upon the situation, it may be desirable to skip or otherwise discard certain types of commands (e.g., discard commands that take a relatively long time such as program commands or erase commands but keep commands that are relatively quick such as read commands or status check commands).

As described above, in some such embodiments (e.g., with a flush bit), discarding further includes re-routing a non-exception-handling firmware instruction, that has passed by a skip-versus-execute fork, back to the skip-versus-execute fork via a path for partially-executed firmware instructions. See, for example, FIG. 7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller system, comprising:
   firmware that is configured to: in response to receiving an indication associated with an exception, assert an exception-handling state variable included in state information;
   hardware that is configured to:
      select one or more firmware instructions from a plurality of firmware instructions based at least in part on: (1) a conditions table that includes one or more conditions for handling the plurality of firmware instructions and (2) the state information that includes the exception-handling state variable; and
      determine how to handle the one or more selected firmware instructions based at least in part on: (1) the conditions table and (2) the state information that includes the exception-handling state variable, wherein:
         the plurality of firmware instructions includes: (1) a non-exception-handling set of one or more firmware instructions that are unrelated to exception handling and (2) an exception-handling set of one or more firmware instructions that are related to exception handling; and
         the conditions table prioritizes execution, by the hardware, of the exception-handling set of firmware instructions over that of the non-exception-handling set of firmware instructions in the event the exception-handling state variable is asserted; and
   an interface that is configured to communicate with a storage media device, wherein:
      the storage media device includes a plurality of dies;
      the state information includes a plurality of die-specific state information;

each one of the plurality of die-specific state information includes a die-specific exception-handling state variable;
the die-specific exception-handling state variable includes a freeze bit;
the firmware is further configured to put the exception-handling set of firmware instructions into a prioritized queue; and
selecting the one or more firmware instructions from the plurality of firmware instructions includes:
in response to the freeze bit being asserted, selecting, for a die in the plurality of dies that corresponds to the asserted freeze bit, the prioritized queue with the exception-handling set of firmware instructions over a lower priority queue with the non-exception-handling set of firmware instructions, as prescribed by the conditions table; and
in response to the freeze bit being de-asserted, resuming selection of, for the die in the plurality of dies that corresponds to the asserted freeze bit, the lower priority queue with the non-exception-handling set of firmware instructions, as prescribed by the conditions table.

2. The storage controller system recited in claim 1, wherein the hardware includes one or more of the following: an application-specific integrated circuit (ASIC) or a field-programmable gate array (FPGA).

3. A storage controller system, comprising:
firmware that is configured to: in response to receiving an indication associated with an exception, assert an exception-handling state variable included in state information;
hardware that is configured to:
select one or more firmware instructions from a plurality of firmware instructions based at least in part on: (1) a conditions table that includes one or more conditions for handling the plurality of firmware instructions and (2) the state information that includes the exception-handling state variable; and
determine how to handle the one or more selected firmware instructions based at least in part on: (1) the conditions table and (2) the state information that includes the exception-handling state variable, wherein:
the plurality of firmware instructions includes: (1) a non-exception-handling set of one or more firmware instructions that are unrelated to exception handling and (2) an exception-handling set of one or more firmware instructions that are related to exception handling; and
the conditions table prioritizes execution, by the hardware, of the exception-handling set of firmware instructions over that of the non-exception-handling set of firmware instructions in the event the exception-handling state variable is asserted; and
an interface that is configured to communicate with a storage media device, wherein:
the storage media device includes a plurality of dies;
the state information includes a plurality of die-specific state information;
each one of the plurality of die-specific state information includes a die-specific exception-handling state variable;
the die-specific exception-handling state variable includes a flush bit; and
determining how to handle the one or more selected firmware instructions includes: in response to the flush bit being asserted, discarding, for a die in the plurality of dies that corresponds to the asserted flush bit, the non-exception-handling set of firmware instructions that are in a queue to-be-flushed, as prescribed by the conditions table.

4. The storage controller system recited in claim 3, wherein discarding further includes selectively discarding based on instruction type so that:
a first non-exception-handling firmware instruction, having a first instruction type and included in the queue to-be-flushed, is kept in the queue to-be-flushed after flushing; and
a second non-exception-handling firmware instruction, having a second instruction type and included in the queue to-be-flushed, is discarded from the queue to-be-flushed after flushing.

5. The storage controller system recited in claim 3, wherein discarding further includes re-routing a non-exception-handling firmware instruction that has passed by a skip-versus-execute fork, back to the skip-versus-execute fork via a path for partially-executed firmware instructions.

6. The storage controller system recited in claim 3, wherein the hardware includes one or more of the following: an application-specific integrated circuit (ASIC) or a field-programmable gate array (FPGA).

7. A method, comprising:
providing firmware that is configured to: in response to receiving an indication associated with an exception, assert an exception-handling state variable included in state information;
providing hardware that is configured to:
select one or more firmware instructions from a plurality of firmware instructions based at least in part on: (1) a conditions table that includes one or more conditions for handling the plurality of firmware instructions and (2) the state information that includes the exception-handling state variable; and
determine how to handle the one or more selected firmware instructions based at least in part on: (1) the conditions table and (2) the state information that includes the exception-handling state variable, wherein:
the plurality of firmware instructions includes: (1) a non-exception-handling set of one or more firmware instructions that are unrelated to exception handling and (2) an exception-handling set of one or more firmware instructions that are related to exception handling; and
the conditions table prioritizes execution, by the hardware, of the exception-handling set of firmware instructions over that of the non-exception-handling set of firmware instructions in the event the exception-handling state variable is asserted; and
providing an interface that is configured to communicate with a storage media device, wherein:
the storage media device includes a plurality of dies;
the state information includes a plurality of die-specific state information;
each one of the plurality of die-specific state information includes a die-specific exception-handling state variable;
the die-specific exception-handling state variable includes a freeze bit;

the firmware is further configured to put the exception-handling set of firmware instructions into a prioritized queue; and selecting the one or more firmware instructions from the plurality of firmware instructions includes:

in response to the freeze bit being asserted, selecting, for a die in the plurality of dies that corresponds to the asserted freeze bit, the prioritized queue with the exception-handling set of firmware instructions over a lower priority queue with the non-exception-handling set of firmware instructions, as prescribed by the conditions table; and in response to the freeze bit being de-asserted, resuming selection of, for the die in the plurality of dies that corresponds to the asserted freeze bit, the lower priority queue with the non-exception-handling set of firmware instructions, as prescribed by the conditions table.

8. The method recited in claim 7, wherein the hardware includes one or more of the following: an application-specific integrated circuit (ASIC) or a field-programmable gate array (FPGA).

9. A method, comprising:

providing firmware that is configured to: in response to receiving an indication associated with an exception, assert an exception-handling state variable included in state information;

providing hardware that is configured to:

select one or more firmware instructions from a plurality of firmware instructions based at least in part on: (1) a conditions table that includes one or more conditions for handling the plurality of firmware instructions and (2) the state information that includes the exception-handling state variable; and determine how to handle the one or more selected firmware instructions based at least in part on: (1) the conditions table and (2) the state information that includes the exception-handling state variable, wherein:

the plurality of firmware instructions includes: (1) a non-exception-handling set of one or more firmware instructions that are unrelated to exception handling and (2) an exception-handling set of one or more firmware instructions that are related to exception handling; and the conditions table prioritizes execution, by the hardware, of the exception-handling set of firmware instructions over that of the non-exception-handling set of firmware instructions in the event the exception-handling state variable is asserted; and providing an interface that is configured to communicate with a storage media device, wherein:

the storage media device includes a plurality of dies;

the state information includes a plurality of die-specific state information;

each one of the plurality of die-specific state information includes a die-specific exception-handling state variable;

the die-specific exception-handling state variable includes a flush bit; and determining how to handle the one or more selected firmware instructions includes: in response to the flush bit being asserted, discarding, for a die in the plurality of dies that corresponds to the asserted flush bit, the non-exception-handling set of firmware instructions that are in a queue to-be-flushed, as prescribed by the conditions table.

10. The method recited in claim 9, wherein discarding further includes selectively discarding based on instruction type so that:

a first non-exception-handling firmware instruction, having a first instruction type and included in the queue to-be-flushed, is kept in the queue to-be-flushed after flushing; and a second non-exception-handling firmware instruction, having a second instruction type and included in the queue to-be-flushed, is discarded from the queue to-be-flushed after flushing.

11. The method recited in claim 9, wherein discarding further includes re-routing a non-exception-handling firmware instruction that has passed by a skip-versus-execute fork, back to the skip-versus-execute fork via a path for partially-executed firmware instructions.

12. The method recited in claim 9, wherein the hardware includes one or more of the following: an application-specific integrated circuit (ASIC) or a field-programmable gate array (FPGA).

* * * * *